United States Patent
Finch

[15] 3,653,142
[45] Apr. 4, 1972

[54] FISHING LURE
[72] Inventor: William M. Finch, 3221 East Oregon, Phoenix, Ariz. 85018
[22] Filed: July 22, 1970
[21] Appl. No.: 57,231

[52] U.S. Cl. ............................................43/42.06, 43/42.16
[51] Int. Cl. .................................................A01k 85/00
[58] Field of Search................................................43/42.06

[56] References Cited

UNITED STATES PATENTS 2,788,604   4/1957   Sleight..................................43/42.06

*Primary Examiner*—Samuel Koren
*Assistant Examiner*—Daniel J. Leach
*Attorney*—Drummond, Cahill & Phillips

[57] ABSTRACT

A fishing lure having a substantially rigid body provided with a substantially rigid loop structure rigidly coupled to said forward end of said body, said loop structure defining a finger-receiving opening for handling said lure during the landing of fish caught thereon and during the removal of hooks on said lure from the mouth of a lively fish.

8 Claims, 5 Drawing Figures

INVENTOR.
WILLIAM M. FINCH
BY
Drummond, Cahill & Phillips
ATTORNEYS

FISHING LURE

In accordance with the use of prior art fishing lures and fishing equipment, a great variety of plugs having rigid bodies are equipped with treble hooks which are quite efficient for catching various fish, such as, for example, large-mouth bass, pike, pickerel, and other game fishes. Most fishermen utilize a light line which is not suitable for landing a fish due to the fact that such lines are usually quite thin so that they are not readily recognized by fish and consequently the tensile strength of such lines is not suitable for landing a fish. Most fishermen apply a light drag load on a fishing line so as to wear a game fish down and physically exhaust him so that he may be drawn close to a boat or the bank and picked up in a net. Such conventional practice generally is time-consuming and very difficult in some environmental conditions.

When a fish has been landed in accordance with prior art practice, the fish and the lure are scooped up in a dip net and the thrashing fish usually causes entanglement of some of the treble hooks of a lure in the mesh of the net and causes great difficulty for the angler since the treble hooks must be untangled or extricated from the mesh of the net during removal of the fish therefrom. Subsequently, the hooks must be removed from the fish's mouth and due to the fact that there are usually several treble hooks, such an operation becomes very difficult with a lively fish caught on one of the hooks. In many instances, the fishermen use pliers; however, the pliers are normally used for grasping the hook that is caught in the fish's mouth and control of the fish as well as the lure during such operations is quite difficult.

In accordance with the present invention, a fishing lure is provided with a rigid body having a rigidly coupled finger-receiving loop at the forward end of the body so that an angler may readily land a fish by placing his finger in an opening defined by said loop and whereby the lure may be securely and firmly held during removal of hooks from the mouth of a fish. In many instances, anglers who fish from boats help each other remove hooks from fish and in using the lure of the present invention one angler may hold the lure securely by its forward loop portion while the other angler holds the fish and readily removes the hook from the fish's mouth. This is particularly important with large and dangerous fish and large lures carrying large treble hooks.

The invention comprises a novel combination of a finger-receiving loop rigidly coupled to the forward end of a lure and wherein a hydrofoil surface of the lure is disposed between spaced arm portions of the loop structure of the lure, the hydrofoil surface being directed forwardly between the arm portions while a line connection means is coupled to the forward portion of the loop structure to avoid interfering with action of water adjacent to said hydrofoil surface.

The lure of the invention may employ a great variety of hydrofoil surfaces so as to be capable of operating as a surface plug, a deep running plug, or any other type of plug desired. The invention also comprises a novel lure body having a finger-receiving loop at its forward end, said loop being provided with a pair of forwardly extending, spaced-apart arms which are of flotation material and which are normally in a horizontal position at opposite sides of a hydrofoil surface of the plug so as to prevent water from being dispersed at either side of the plug at the surface during action of the water relative to the hydrofoil surface of the plug. In this manner, water is reacted forwardly relative to the hydrofoil surface of the plug between the spaced-apart arms of the loop structure, at the forward end of which a fishing line is coupled.

The foregoing features of the loop structure and hydrofoil surface provides for proper water-disturbing characteristics without the use of any additional pieces of hardware being coupled to the body of the lure. Furthermore, the spaced-apart arms of the loop structure of the invention serve as a horizontal stabilizer for the lure due to the fact that these arms are made of flotation material and are generally disposed in a horizontal plane relative to each other. The line connection means of the lure of the invention is connected remotely and in spaced relation with the hydrofoil surface of the lure so that no structure extends through or alters the natural water-disturbing characteristics of the hydrofoil surface of the lure. The loop structure of the invention extending forwardly from the body of the lure supports a line connection means in forwardly disposed relation to the hydrofoil surface of the lure so that the action of the lure in the water at the hydrofoil surface may attract fish without the disposition of a line or line connection means in the area of the water which is disturbed by the hydrofoil surface. Thus, there is no line or line connection means in this area to deter the fish from attacking the lure.

Accordingly, it is an object of the present invention to provide a novel fishing lure having loop structure at its forward end defining an opening for receiving a finger of an angler's hand so as to permit the angler to land a fish by means of the lure and to afford some facility in the removal of hooks from a lively fish's mouth.

Another object of the invention is to provide a novel lure having a rigid unitary body and finger-receiving loop structure at the forward end thereof which serves as a very efficient retrieval and handling device for landing fish without the use of a dip net.

Another object of the invention is to provide a fishing lure having novel loop structure provided with a pair of spaced-apart horizontally disposed arms serving as stabilizers for the lure when used as a surface plug or otherwise.

Another object of the invention is to provide a lure having a novel body provided with a loop structure at the forward end wherein a pair of spaced-apart arms defining the loop structure are disposed at opposite sides of a hydrofoil surface so that disturbance of water is directly forward and not dispersed at the sides of the lure.

Another object of the invention is to provide a lure having novel water-disturbing characteristics.

Still another object of the invention is to provide a lure having a loop structure at its forward end for connection to a fishing line and wherein a hydrofoil surface is disposed rearwardly of the line connection means in spaced relation therewith so as to provide for novel water-disturbing characteristics without having a line directly connected to an area of the hydrofoil surface of the lure.

A further object of the invention is to provide a fishing lure having a novel finger-receiving loop structure which enables an angler to land the fish by utilizing the lure without the necessity of employing a dip net.

Further objects and advantages of the invention may be apparent from the following specification, appended claims, and accompanying drawings, in which:

FIG. 1 is a perspective view of an angler's hand engaging a loop structure of the lure of the invention and landing a fish caught on hooks in connection with the lure body.

FIG. 2 is a top or plan view of a fishing lure in accordance with the present invention.

Figure 3:
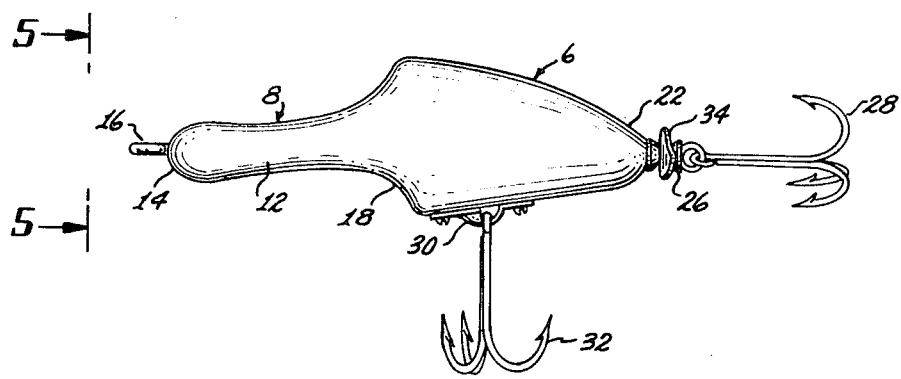
FIG. 3 is a side elevational view of a fishing lure in accordance with the present invention.

As shown in FIG. 2 of the drawings, the lure of the invention is provided with a substantially rigid body 6 having a finger-receiving loop structure 8 coupled thereto. The body 6 and loop structure 8 are preferably rigid structures and are rigidly connected together, as, for example, the structure shown in the drawings comprising integral unitary construction of the body 6 and loop structure 8. It will be apparent to those skilled in the art that a rigid body may be equipped with a rigid loop structure which is of different material but rigidly connected to the body 6. Many different structural arrangements may be made; however, many of the plastic materials are suitable for casting or otherwise forming the loop structure 8 in a rigid unitary relationship to the body 6.

Figure 4:
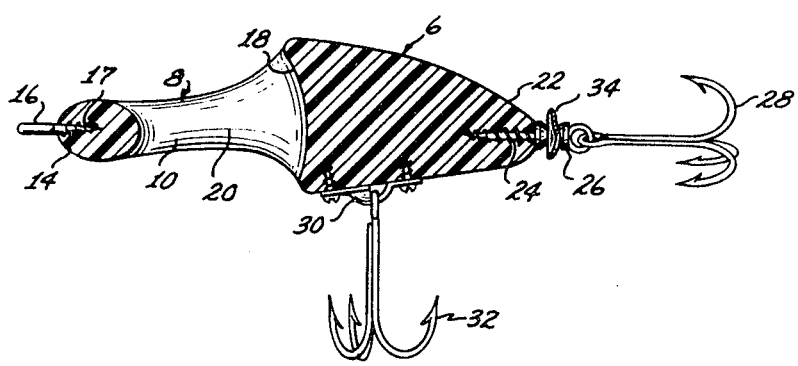
FIG. 4 is a longitudinal sectional view taken from line 4—4 of FIG. 2.
Figure 5:
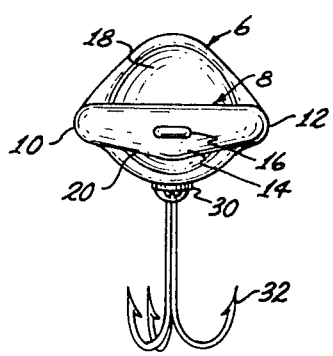
FIG. 5 is an end view of the lure of the invention taken from the line 5—5 of FIG. 3.

The loop structure 8 is provided with a pair of spaced-apart arm portions 10 and 12 which are integral with each other at a forward portion 14 of the lure and at this forward portion is a metal eye member 16 having a shank 17 embedded in the portion 14 as shown best in FIGS. 2 and 4 of the drawings.

This eye 16 is a suitable line connection means for connecting a swivel or other connection structure as desired.

The spaced-apart arm portions 10 and 12 of the loop structure 8 straddle a hydrofoil surface 18 of the lure body 6. The hydrofoil surface 18 and the spaced-apart arms 10 and 12, as well as the forward portion 14, define a finger-receiving opening 20 which is adapted to receive an angler's finger for handling the lure of the invention as well as a fish caught on hooks in connection with the lure, as shown in FIG. 1 of the drawings.

The spaced-apart arm portions 10 and 12 of the loop structure 8 are preferably of flotation material and are adapted to lie in a horizontal plane relative to each other, as shown best in FIG. 3 of the drawings, so as to provide for stabilization of the lure. These arm portions 10 and 12 are disposed forwardly and at opposite sides of the hydrofoil surface 18 so as to prevent undue water disturbance from being created laterally relative to the lure as it is drawn longitudinally through the water. The hydrofoil surface 18 may be designed in various ways and may assume various configurations so as to provide for various water-disturbing characteristics or may be designed for various operations, such as may be desirable for surface lures or deep running lures. The body 6 of the lure of the invention is provided with a streamlined rearward end 22 in which a shank 24 of a hook connection eye structure 26 is embedded, as shown best in FIG. 4 of the drawings. A treble hook 28 is secured to the eye structure 26 at said rear end 22 of the body 6.

A substantially conventional belly fixture 30 is secured to a normally lower portion of the body 6 and supports a treble hook 32 in spaced relation to the loop structure 8 so as to be out of the way and not dangerous to a person's finger when inserted through the finger-receiving opening 20 between the arm portions 10 and 12 of the loop structure 8.

Various hooks and devices, such as spinners or the like, may be coupled to the body of the lure of the invention, as, for example, a propeller spinner 34 mounted rotatably on the shank 24 near the eye structure 26, if desired.

In operation, a light line may be coupled to the line connection means 16 so as to provide for a minimum of visual disturbance by the line and the loop structure 8 may readily be used for landing a fish without a net and without stress to the light line connected with the line connection means 16, as shown in FIG. 1 of the drawings.

During initial operation of the lure of the invention, the lure may be cast into a likely spot and may be drawn through the water by said line, whereupon the hydrofoil surface 18 disturbs water and causes action of the water to be directed forwardly relative thereto and between the loop structure arms 10 and 12. The arms 10 and 12 are generally of flotation material and provide for horizontal stabilization of the lure and also prevent lateral dispersion of the hydraulic disturbance created by the hydrofoil surface 18. Thus, the disturbance is novel and directed forwardly and in a downward direction relative to the lure of the invention.

The rigid relationship of the loop structure 8 and the body 6 provides for efficient and safe handling of the lure as well as the landing of a fish, as shown in FIG. 1 of the drawings, and this rigid relationship between the loop structure 8 and the body 6 may also serve advantageously during the removal of either the treble hook 32 or the treble hook 28 from the fish's mouth after he is landed. This may be accomplished by holding the loop structure 8 with a finger of one hand, by engaging pliers with the hook in the fish's mouth while holding the fish down either by help of another person or by the foot of the angler, as desired. This mode of handling a fish during landing and hook removal saves a great deal of time and greatly reduces the hazard to the fisherman which may be present during the landing and hook removal operations relative to catching fish, such as bass and/or some of the larger powerful species. Additionally, it will be appreciated that the use of the loop structure 8 obviates the necessity for using a landing net and the attendant difficulties encountered when treble hooks are caught in the net after a fish is scooped up thereby.

It will be appreciated that the structure and mode of operation as hereinbefore described is by way of example only and that a great variety of fishing lures, such as surface plugs, deep running plugs, and/or many others, may be provided with the features of the invention and that the general combination of the lure body and the loop structure 8 may be utilized efficiently for landing fish and handling them in connection with the lure, as hereinbefore described, and it will be recognized that the finger-receiving loop structure 8 in connection with the body 6 may be particularly advantageous in the handling of lures on which large powerful fish are caught, and, furthermore, the invention may be very useful to anglers in remote areas and in environmental conditions where an angler does not desire to carry a net and yet desires to catch fish on light tackle.

I claim:

1. In a fishing lure, the combination of: a lure body having forward and rearward ends; hook means connected to said body; said body having a substantially rigid open loop structure at its forward end; said loop structure rigidly coupled to said body; and a line connection means coupled to said loop structure at said forward end; said open loop structure defining an unobstructed finger-receiving opening for handling said lure and a fish during the landing of said fish and during removal of said hook means from the mouth of a lively fish.

2. The invention as defined in claim 1, wherein said loop structure comprises a pair of spaced-apart arm portions disposed at opposite sides of said finger-receiving opening, said arm portions normally adapted to lie in a horizontal plane relative to each other.

3. The invention as defined in claim 2, wherein said arms are of flotation material.

4. The invention as defined in claim 2, wherein said body is provided with a hydrofoil surface facing forwardly into said opening between said arm portions; said hydrofoil surface thus being spaced a considerable distance rearwardly relative to said line connection means.

5. The invention as defined in claim 4, wherein said hydrofoil surface comprises cross-sectional dimensions considerably greater than cross-sectional dimensions of said arms.

6. The invention as defined in claim 1, wherein said finger-receiving opening of said loop structure is spaced from said hook means.

7. The invention as defined in claim 1, wherein said loop structure is integral relative to said body whereby said body and loop portions are rigidly unitary.

8. The invention as defined in claim 4, wherein said line connection means is so disposed forwardly relative to said hydrofoil surface that said line connection means does not interfere with action of water relative to said hydrofoil surface as said lure is drawn through the water by a line coupled to said line connection means.

* * * * *